(12) United States Patent
Von Novak, III et al.

(10) Patent No.: US 10,003,220 B2
(45) Date of Patent: Jun. 19, 2018

(54) RECONFIGURABLE WIRELESS POWER RESONATOR

(71) Applicant: QUALCOMM Incorporated, San Diego, CA (US)

(72) Inventors: William Henry Von Novak, III, San Diego, CA (US); Sumukh Shevde, Carlsbad, CA (US); Kelsey Burrell, Santee, CA (US); Joseph Maalouf, San Diego, CA (US); Mei-Li Chi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 15/264,854

(22) Filed: Sep. 14, 2016

(65) Prior Publication Data

US 2018/0076666 A1 Mar. 15, 2018

(51) Int. Cl.
*H02J 50/12* (2016.01)
*H02J 7/02* (2016.01)
*H02J 50/80* (2016.01)
*H02J 50/90* (2016.01)

(52) U.S. Cl.
CPC .............. *H02J 50/12* (2016.02); *H02J 7/025* (2013.01); *H02J 50/80* (2016.02); *H02J 50/90* (2016.02)

(58) Field of Classification Search
CPC .. H02J 50/12; H02J 7/025; H02J 50/80; H02J 50/90
See application file for complete search history.

(56) References Cited

U.S. PATENT DOCUMENTS

| | | |
|---|---|---|
| 2013/0049484 A1 | 2/2013 | Weissentern et al. |
| 2015/0333562 A1 | 11/2015 | Nam et al. |
| 2016/0111911 A1 | 4/2016 | Iwabuchi |
| 2016/0141884 A1 | 5/2016 | Lee et al. |
| 2016/0241075 A1 | 8/2016 | Von Novak, III et al. |

OTHER PUBLICATIONS

Dang Z., et al., "Reconfigurable Magnetic Resonance-Coupled Wireless Power Transfer System", IEEE Transactions on Power Electronics, Nov. 2015, vol. 30, No. 11, pp. 6057-6069.
Lee G., et al., "A Reconfigurable Resonant Coil for Range Adaptation Wireless Power Transfer", IEEE Transactions on Microwave Theory and Techniques, Feb. 2016, vol. 64, No. 2, pp. 624-632.
Zhu D., et al., "Near field wireless power transfer using curved relay resonators for extended transfer distance", Journal of Physics: Conference Series, IOP Publishing, 2015, vol. 660, Issue 1, pp. 1-5.
International Search Report and Written Opinion—PCT/US2017/049145—ISA/EPO—dated Nov. 10, 2017.

*Primary Examiner* — Robert Deberadinis
(74) *Attorney, Agent, or Firm* — Patterson & Sheridan, L.L.P.

(57) ABSTRACT

Certain aspects of the present disclosure relate to methods and apparatus for reconfiguring wireless power resonator. Certain aspects of the present disclosure provide a wireless power resonator. The wireless power resonator includes a first section. The wireless power resonator further includes a second section electrically coupled and physically coupled to the first section. The second section is configured to be movable with respect to the first section while remaining both electrically coupled and physically coupled to the first section to change an effective area of the wireless power resonator.

26 Claims, 6 Drawing Sheets

ADJUST AN EFFECTIVE CHARGING AREA OF A WIRELESS POWER TRANSMITTER BY MOVING A FIRST SECTION OF A RESONATOR OF THE WIRELESS POWER TRANSMITTER WITH RESPECT TO A SECOND SECTION OF THE RESONATOR BY AN AMOUNT OF DISTANCE

*FIG. 6*

RECONFIGURABLE WIRELESS POWER RESONATOR

TECHNICAL FIELD

The present disclosure relates generally to wireless power transfer, and in particular to a reconfigurable wireless power resonator.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power transfer systems, for example, may allow users to charge and/or power electronic devices without physical, electrical connections, thus reducing the number of components required for operation of the electronic devices and simplifying the use of the electronic device.

Different electronic devices incorporating components of such wireless power transfer systems may have different shapes, sizes, and power requirements. Accordingly, there is flexibility in having different sizes and shapes in the components (e.g., resonators, magnetic coil, charging plate, etc.) that make up a wireless power transmitter and/or a wireless power receiver in terms of industrial design and support for a wide range of devices. For example, the wireless power transmitter and/or wireless power receiver may include resonators (e.g., antenna, coil, loop antenna, etc.) that may be used to wirelessly output or receive energy.

In some designs, a wireless power transmitter may include a relatively large transmitting resonator so that multiple electronic devices with wireless power receivers may be charged at the same time by the single wireless power transmitter. When there are enough wireless power receivers, or the receiving resonator(s) of one or more wireless power receivers are large enough to cover the area of the transmitting resonator, the transmitting resonator may be appropriately sized and the energy output by the wireless power transmitter may be properly utilized.

However, in cases where the receiving resonator(s) do not cover the entire area of the transmitting resonator, the rest of the transmitting resonator may be effectively wasted. This unused portion of the transmitting resonator may carry current and result in both resistive and capacitive power losses, thus reducing efficiency. Further, the unused portions of the transmitting resonator may emit an H-field and higher frequency radiation (e.g., EMI), posing an exposure risk. Further, the unused portion of the transmit resonator may become detuned by coupling with the metal case of a wireless power receiving device, thus reducing efficiency.

SUMMARY

Certain aspects of the present disclosure provide a wireless power resonator. The wireless power resonator includes a first section. The wireless power resonator further includes a second section electrically coupled and physically coupled to the first section. The second section is configured to be movable with respect to the first section while remaining both electrically coupled and physically coupled to the first section to change an effective area of the wireless power resonator.

Certain aspects of the present disclosure provide a wireless power transmitter. The wireless power transmitter includes a housing including a first portion and a second portion configured to be movable with respect to one another. The wireless power transmitter further includes a resonator including a first section attached to the first portion of the housing. The resonator further includes a second section attached to the second portion of the housing. The second section is configured to be movable with respect to the first section.

Certain aspects of the present disclosure provide a wireless power resonator. The wireless power resonator includes a resonator. The wireless power resonator further includes a shorting bar configured to electrically couple a first portion of the resonator to a second portion of the resonator. The shorting bar is configured to be movable with respect to the resonator while remaining both electrically coupled and physically coupled to the resonator to change an effective area of the resonator.

Certain aspects of the present disclosure provide a method of operating a wireless power transmitter. The method includes adjusting an effective charging area of the wireless power transmitter. The adjusting includes moving a first section of a resonator with respect to a second section of the resonator by an amount of distance. The second section is coupled electrically and physically to the first section The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
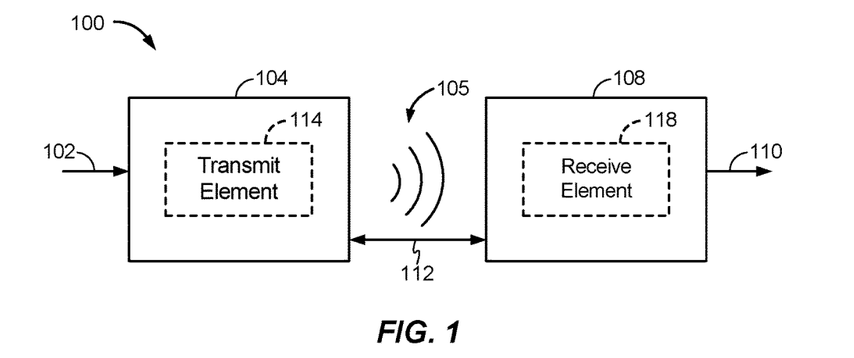
FIG. 1 is a functional block diagram of a wireless power transfer system, according to certain aspects of this disclosure.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near field may correspond to a region in which there are strong reactive fields resulting from the currents and charges in the power transmitting element 114 that minimally radiate power away from the power transmitting element 114. The near field may correspond to a region that is within about one wavelength (or a fraction thereof) of the power transmitting element 114. Conversely, the far field may correspond to a region that is greater than about one wavelength of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
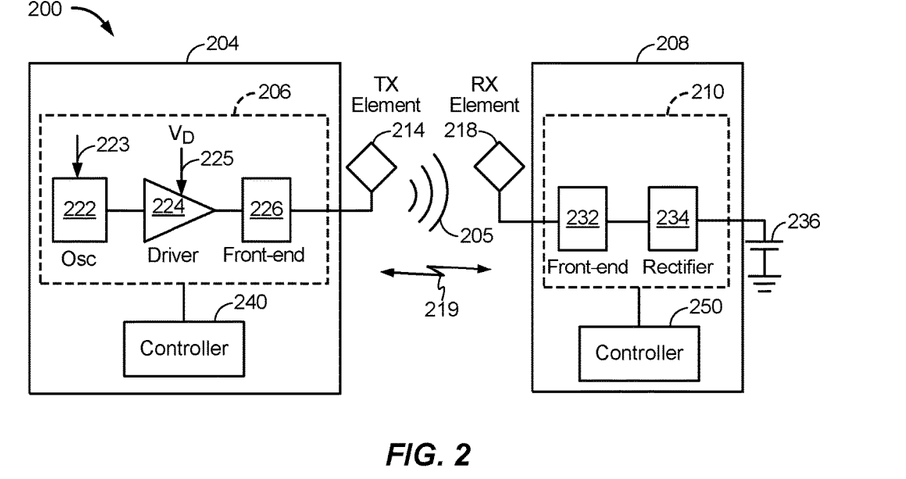
FIG. 2 is a functional block diagram of a wireless power transfer system, according to certain aspects of this disclosure.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency (e.g., fundamental frequency) that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
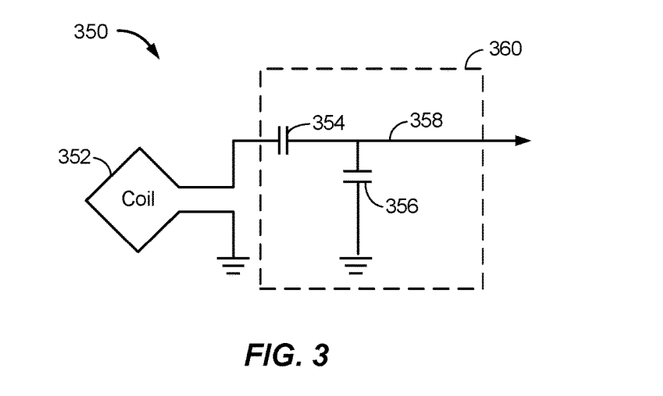
FIG. 3 is a schematic diagram of a portion of transmit circuitry or receive circuitry of FIG. 2 including a power transmitting or receiving element, according to certain aspects of this disclosure.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit and/or receive circuitry 350 to create a resonant circuit. In some aspects, one or both of capacitor 354 and 356 may be variable capacitors to tune the tuning circuit 360.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

In some aspects, the power transmitting or receiving element 352 may have a fixed size and shape. In particular, the power transmitting or receiving element 352 may be a resonator having a fixed size and shape. For example, the power transmitting element 352 may be implemented as a large transmitting resonator so that multiple electronic devices with wireless power receivers may be charged at the same time by a single wireless power transmitter. As discussed herein, when the entire surface area of the transmitting resonator is covered by receiving resonators of wireless power receivers, the transmitting resonator may be fully utilized and appropriately sized. However, in cases where the transmitting resonator is not fully covered, areas of the transmitting may be effectively wasted. For example, a large device may have a small receiving resonator that is smaller than the transmitting resonator, such that when placed on the transmitting resonator, there is not room to place other devices with receiving resonators on the transmitting resonator. In another example, fewer devices than the transmitting resonator is capable of accommodating may be placed on the transmitting resonator.

This unused portion of the transmitting resonator may carry current and result in both resistive and capacitive power losses, thus reducing efficiency. Further, the unused portions of the transmitting resonator may emit an H-field and higher frequency radiation (e.g., EMI), posing an exposure risk. Further, the unused portion of the transmit resonator may become detuned by coupling with the metal case of a wireless power receiving device, thus reducing efficiency. Accordingly, certain aspects described herein provide techniques for a reconfigurable resonator. In particular, certain aspects relate to transmitting resonators having an adjustable size so as to effectively utilize an area of the resonator for wireless power transfer.

Figure 4:
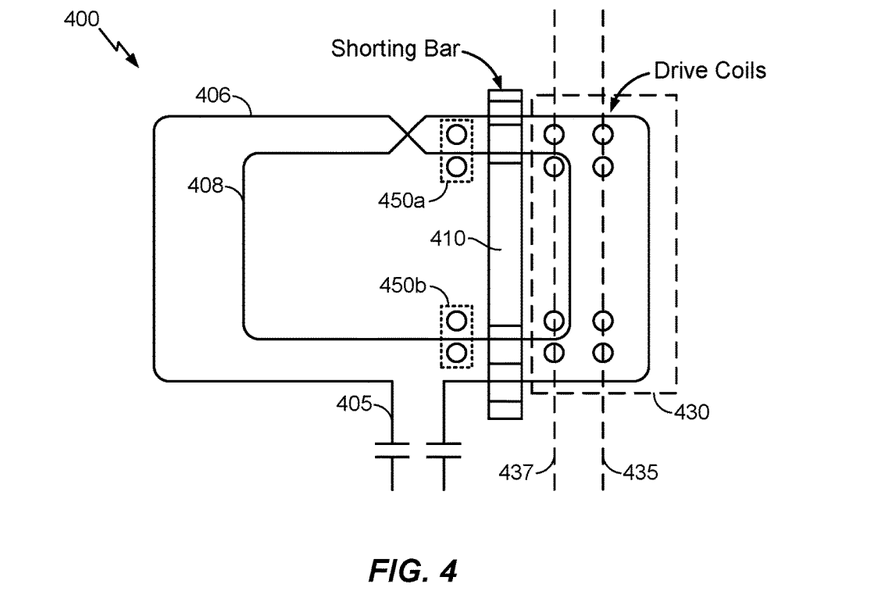
FIG. 4 illustrates a reconfigurable resonator system for wireless power transfer, according to certain aspects of this disclosure.

FIG. 4 illustrates a reconfigurable resonator system 400 for wireless power transfer, according to certain aspects of this disclosure. As shown, the resonator system 400 includes a resonator 405. The resonator 405 as shown is a two-turn rectangular resonator including a first turn 406 and a second turn 408. However, the resonator 405 may have a different geometry and/or a different number of turns or windings. The resonator 405 may be made of copper-clad steel or another appropriate conductive material. For example, the resonator 405 may be formed of copper-clad steel resonator wires.

Further, as shown, the resonator system 400 includes a shorting bar 410. Though resonator system 400 is shown as having only one shorting bar 410, the resonator system 400 may include additional shorting bars. For example, there may be a second shorting bar parallel to the shorting bar 410 placed on the opposite side of the resonator 405. The shorting bar 410 may be substantially cylindrically shaped or bar shaped, allowing it to roll or slide back and forth across the resonator 405.

Figure 4A:
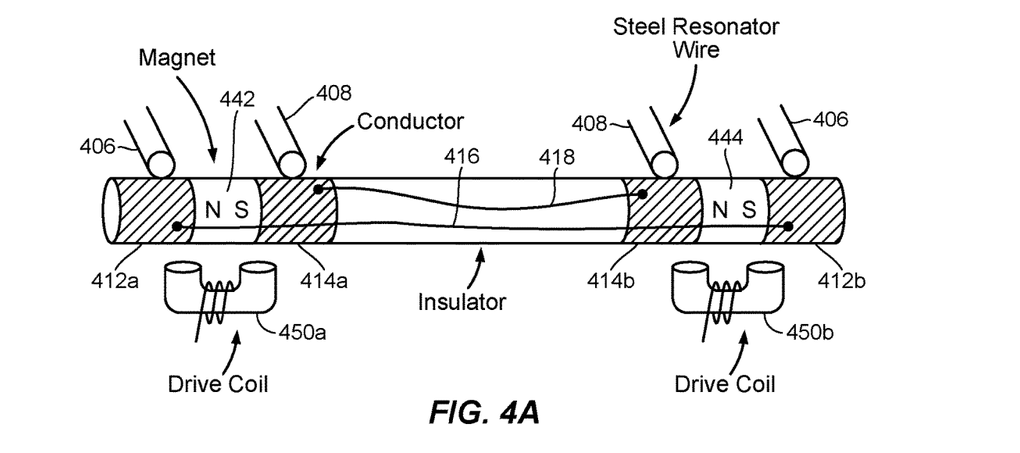
FIG. 4A illustrates a shorting bar for the reconfigurable resonator system for wireless power transfer of FIG. 4, according to certain aspects of this disclosure.

As shown in FIG. 4A, the shorting bar 410 may include conductive sections 412 (including sections 412a and 412b) and 414 (including sections 414a and 414b). In some aspects, the conductive sections 412 and 414 may be made of a conductive material (e.g., copper) that is coated over another base material, which may be conductive or non-conductive. In some aspects, the conductive sections 412 and 414 may be made of a solid conductive material throughout the volume of the shorting bar 410. In some aspects, conductive sections 412 and 414 may be electrically insulated from one another to prevent turns of the resonator 405 from being electrically shorted to one another.

The conductive sections 412 and 414 may be formed on the shorting bar 410 so as to align with and contact the turns 406 and 408, respectively, of the resonator 405. Accordingly, as the shorting bar 410 moves back and forth across the resonator 405, the conductive sections 412 and 414 may remain in physical contact with and electrically coupled to the turns 406 and 408, respectively, of the resonator 405. In particular, the conductive sections 412a and 414a may be formed near a first end of the shorting bar 410 as shown, and the conductive sections 412b and 414b may be formed at a second end of the shorting bar 410 as shown. Further, the conductive section 412a may be electrically coupled to the conductive section 412b by a conductive element 416, and the conductive section 414a may be electrically coupled to the conductive section 414b by a conductive element 418. For example, the conductive elements 416 and 418 may be wires (e.g., copper-clad steel resonator wires) or other conductive element formed internally or externally to the shorting bar 410. In some aspects, the conductive elements 416 and 418 may include an insulating material on an outer surface of the conductive elements 416 and 418 to prevent unwanted electrical shorts.

Since the conductive sections 412a and 412b are formed at different ends of the shorting bar 410 as shown, they may contact the turn 406 at two locations across a dimension (e.g., length or width) of the resonator 405. Further, since the conductive sections 412a and 412b are electrically coupled by the conductive element 416, the conductive section 412 and conductive element 416 may short the turn 406, thereby effectively reducing the area (e.g., effective area) of the turn 406. Similarly, the conductive section 414 and conductive element 418 may short the turn 408, thereby effectively reducing the area of the turn 408. For example, a current passed through the resonator 405 may flow through the shorting bar 410 and not flow through the portion shown as 430 of the resonator 405 that is further from the current source. Accordingly, the effective size/area of the resonator 405 may be modified based on the position of the shorting bar 410. For example, at position 435, the effective size of the resonator 405 may be greater than at the position 437. In some embodiments, the resonator 405 may not include any additional conductive elements (e.g., wires) parallel to the dimension that the shorting bar 410 extends, and rather may only comprise conductive elements (e.g., wires) perpendicular to the shorting bar 410.

In some aspects, the shorting bar 410 may be configured to be moved manually. For example, the shorting bar 410 may be affixed to mechanical elements that are moved by a user and locked in different positions by a locking mechanism.

In some aspects, the shorting bar 410 may include magnetic sections and the resonator system 400 may include corresponding electromagnets (e.g., including drive coils) placed along the resonator 405 that can be used to move the shorting bar 410 along the resonator 405. For example, as shown, the shorting bar 410 may include magnetic sections 442 and 444. The magnetic sections 442 and 444 may be formed, as shown, between the conductive sections 412 and 414, or at other portions along the shorting bar 410. The magnetic sections 442 and 444 may be insulated by a non-conductive material from the conductive sections 412 and 414 to prevent an electrical short between the conductive sections 412 and 414. In some aspects, the magnetic sections 442 and 444 may be made of a magnetic material that is coated over another base material. In some aspects, the magnetic sections 442 and 444 may be made of a solid magnetic material throughout the volume of the shorting bar 410. The magnetic sections 442 and 444 may help keep the shorting bar 410 physically coupled to the resonator 405 through magnetic forces.

Electromagnets 450 may be placed along the resonator 405 as shown in FIG. 4B. In particular, electromagnets 450 may be placed along the resonator 405 near where the magnetic section 442 and 444 are on the shorting bar 410 as the bar moves along the resonator 405. Accordingly, a first set of electromagnets 450a may be spaced along the resonator 405 near the magnetic section 442, and a second set of electromagnets 450b may be spaced along the resonator 405 near the magnetic section 444. In some aspects the electromagnets 450a and 450b may be aligned with each other across an axis along which the shorting bar 410 moves, forming a set of aligned pairs of electromagnets 450a and 450b. Further, each of the electromagnets 450a (and accordingly electromagnets 450b) may be spaced (e.g., evenly or unevenly) at desired shorting locations for the shorting bar 410.

The electromagnets 450 may include drive coils, which may be selectively coupled to a power source (e.g., voltage supply), by a series of switches. Accordingly, the electromagnets 450 may be separately coupled to the power source. When an electromagnet 450 is coupled to the power source, the electromagnet 450 may generate a magnetic field, and therefore attract the magnetic sections 442 and 444 of the shorting bar 410 to the electromagnet 450 generating the magnetic field. Accordingly, by selectively powering the electromagnets 450, the shorting bar 410 can be magnetically moved to a location where the electromagnet 450 is located. For example, each electromagnet 450 of an aligned pair of electromagnets 450a and 450b may be configured to be coupled to a power source together. Further, each aligned pair of electromagnets 450a and 450b may be configured to be coupled to the power source separately from the other aligned pair of electromagnets 450a and 450b. The switches that couple the power source to the electromagnets 450 may be controlled by a controller (e.g., controller 240).

Figure 5:
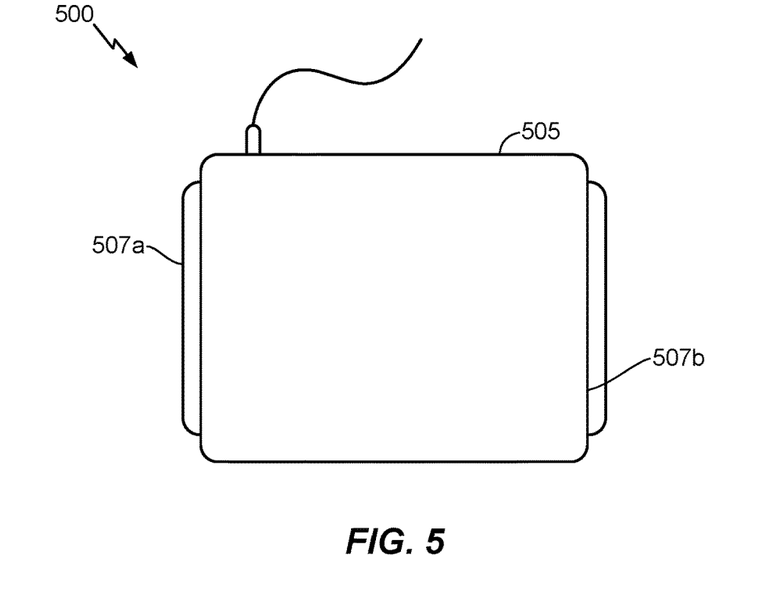
FIG. 5 illustrates an external view of another reconfigurable resonator system for wireless power transfer, according to certain aspects of this disclosure.
Figure 5A:
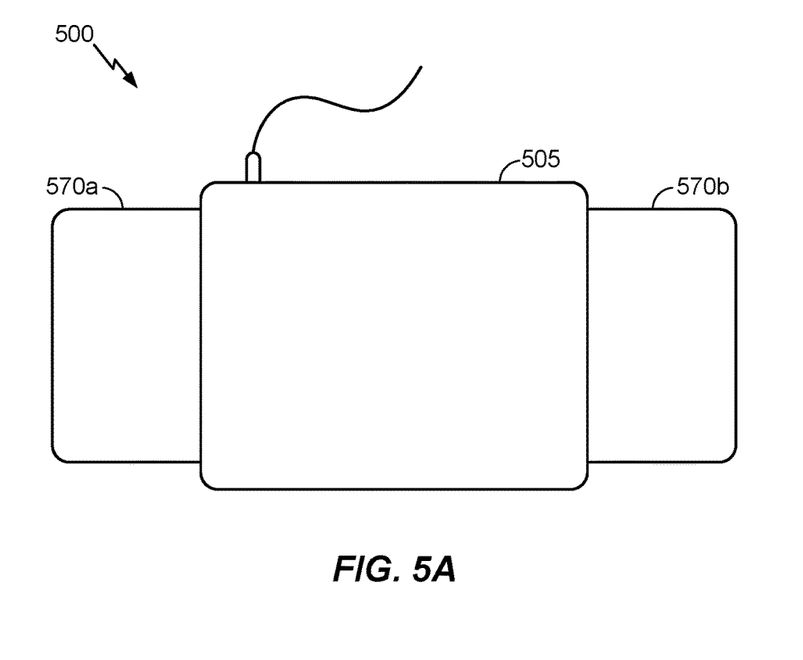
FIG. 5A illustrates another external view of the reconfigurable resonator system for wireless power transfer of FIG. 5, according to certain aspects of this disclosure.

FIG. 5 illustrates a reconfigurable resonator system 500 for wireless power transfer, according to certain aspects of this disclosure. FIG. 5 illustrates an external view of the resonator system 500. As shown the resonator system includes a base section 505 and extendable sections 507a and 507b. Though resonator system 500 is shown as having two extendable sections 507, it should be noted that the resonator system 500 may have fewer or more extendable sections 507. The extendable sections 507 may be configured to move or extend with respect to the base section 505. For example, as shown, the extendable sections 507 may move toward the base section 505, thus reducing an area of the resonator system 500, or move away from the base section 505, thus increasing an area of the resonator system 500. The extendable sections 507 may be configured to move to a number of positions with respect to the base section 505. For example, the extendable sections 507 may move to a base position as shown in FIG. 5, where the extendable sections are closest to the base section 505, and a max position as shown in FIG. 5A, where the extendable sections are furthest from the base section 505. In some aspects, the external housing of the base section 505 and extendable sections 507 may be made of interlocking pieces (e.g., plastic or another appropriate non-conductive material) that slide with respect to one another. For example, the extendable sections 507 may slide into, over, or under the base section 505. In some aspects, the base section 505 and extendable sections 507 may be manually moved by a user with respect to one another. In some aspects, the base section 505 and extendable sections 507 may be moved by a motorized system (e.g., including gears and a motor) (e.g., powered by a voltage source such as the voltage source that supplies signal 225). As shown, the resonator system 500 has a generally rectangular shape that changes in area as the extendable sections 507 are moved with respect to the base section 505. Further, each of the base section 505 and extendable sections 507 have a generally rectangular shape. However, the resonator system 500 and each of the base section 505 and extendable sections 507 may have another appropriate shape.

Figure 5B:
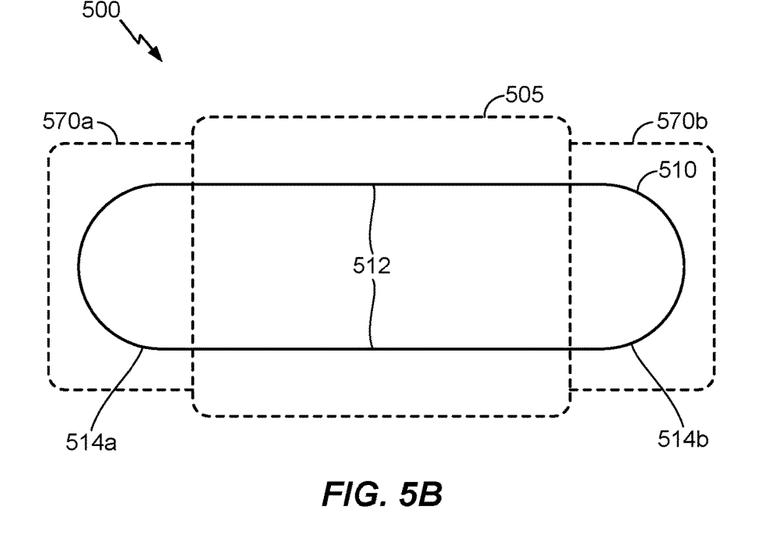
FIG. 5B illustrates an internal view of the reconfigurable resonator system for wireless power transfer of FIG. 5, according to certain aspects of this disclosure.

The base section 505 and the extendable sections 507 may each include portions of a resonator 510 as shown in FIG. 5B, which shows an internal view of the resonator system 500 according to one aspect. For example, the base section 505 may include a base portion 512 of the resonator 510. Each of the extendable sections 507a and 507b may include extendable portions 514a and 514b, respectively, of the resonator 510. As shown, the resonator 510 is a single-turn rectangular resonator. However, the resonator 510 may have a different geometry and/or a different number of turns. The resonator 510 may be made of copper-clad steel or another appropriate conductive material. For example, the resonator 510 may be formed of copper-clad steel resonator wires.

The extendable portions 514a and 514b may be movable with respect to the base portion 512. In particular, the extendable portions 514a and 514b may move with respect to the base portion 512 when the extendable sections 507a and 507b are moved with respect to the base section 505. For example, the base portion 512 of the resonator 510 may be physically coupled to the base section 505, and the extendable portions 514 may be physically coupled to the extendable sections 507. Accordingly, as the extendable portions 514 are moved away from the base portion 512, the area of the resonator 510 is increased, and as the extendable portions 514 are moved toward the base portion 512, the area of the resonator 510 is decreased.

Figure 5C:
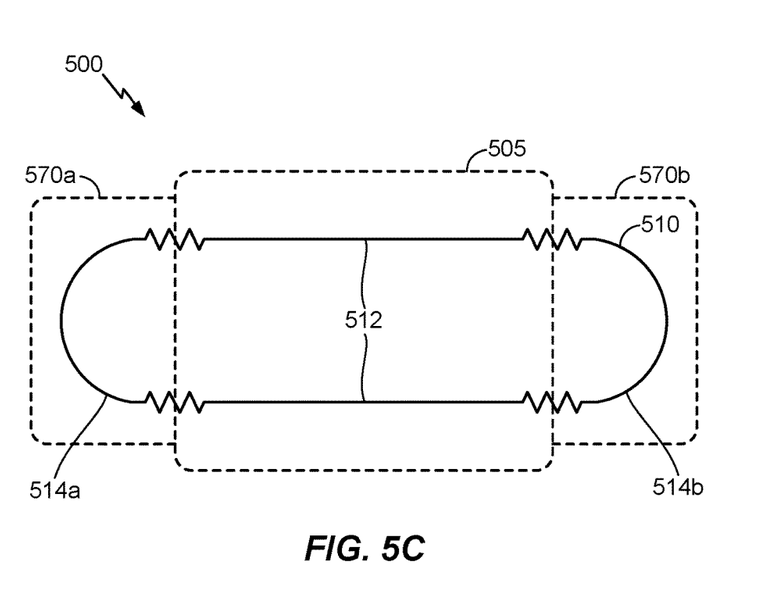
FIG. 5C illustrates an internal view of the reconfigurable resonator system for wireless power transfer of FIG. 5, according to certain aspects of this disclosure.
Figure 5D:
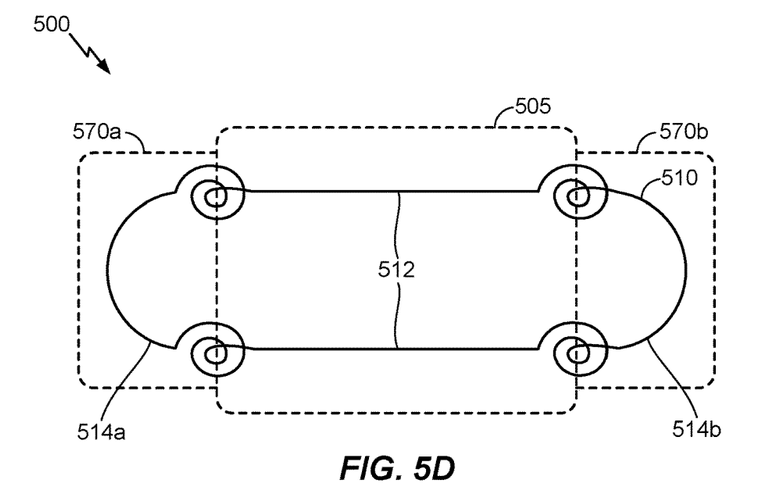
FIG. 5D illustrates an internal view of the reconfigurable resonator system for wireless power transfer of FIG. 5, according to certain aspects of this disclosure.

The base portion 512 and extendable portions 514 may be electrically coupled together even as they move with respect to each other. In some aspects, at least a portion of the base portion 512 and/or extendable portions 514 may be made of a flexible wire/conductor (and any remaining portion may be made of a non-flexible wire/conductor) that stretches as the extendable portions move away from the base portion 512 and contracts as the extendable portions 514 move toward the base portion 512, as shown in FIG. 5B. In some aspects, at least a portion of the base portion 512 and/or extendable portions 514 may be made of a formed wire (e.g., kinked, coiled, etc.) that deforms (e.g., unkinks, uncoils, etc.) as the extendable portions move away from the base portion 512 and reforms (e.g., kinks, coils, etc.) as the extendable portions 514 move toward the base portion 512, as shown in FIGS. 5C and 5D.

Figure 5E:
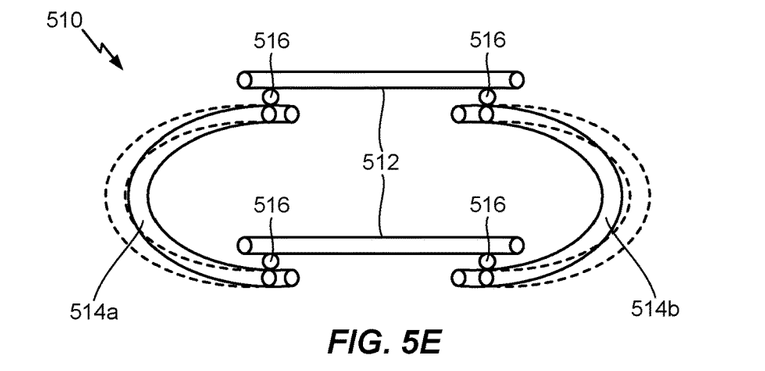
FIG. 5E illustrates an internal view of the reconfigurable resonator system for wireless power transfer of FIG. 5, according to certain aspects of this disclosure.

In some aspects, the base portion 512 and extendable portions 514 may be coupled via contact mechanisms 516, as shown in FIG. 5E. For example, the base portion 512 and extendable portions 514 may be made of a solid wire conductor forming the resonator 510. Further, the extendable portions 514 of the resonator 510 may be able to slide above or below the base portion 512. In particular, parts of the base portion 512 and extendable portions 514 may overlap each other, with the contact mechanisms 516 maintaining electrical coupling between the base portion 512 and the extendable portions 514. In some aspects, the base portion 512 may comprise substantially linear-shaped parallel conductors as shown, and the extendable portions 514 may comprise linear-shaped sections that overlap with the base portion 512, as shown, as the extendable portions 514 slide with respect to the base portion 512. The extendable portions 514 may further comprise a substantially U-shaped portion between the linear-shaped sections as shown.

Figure 5F:
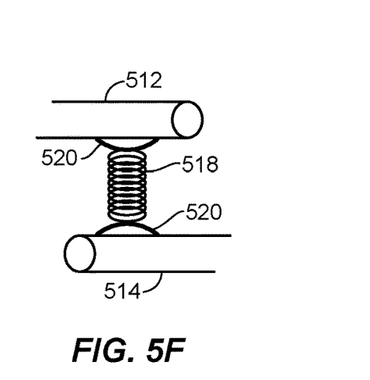
FIG. 5F illustrates a contact mechanism of the reconfigurable resonator system for wireless power transfer of FIG. 5E, according to certain aspects of this disclosure.

As shown in FIG. 5F, the contact mechanisms 516 may be spring mechanisms 518, which may be made of conductive springs and may include conductive contacts 520 that are shaped to conform to and maintain contact with the base portion 512 on one end of the spring mechanism 516 and the extendable portion 514 on the other end of the spring mechanism 518. Accordingly, the spring mechanisms 518 may electrically couple the base portion 512 to the extendable portions 514. The spring mechanisms 518 may have sufficient tension to maintain contact with the base portion 512 and extendable portions 514 as they slide with respect to one another.

Figure 5G:
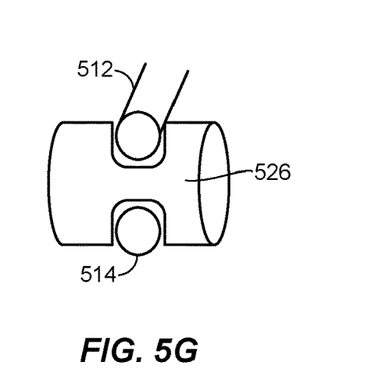
FIG. 5G illustrates a contact mechanism of the reconfigurable resonator system for wireless power transfer of FIG. 5E, according to certain aspects of this disclosure.

In some aspects, the contact mechanisms 516 may be magnetic mechanisms 526, as shown in FIG. 5G. The magnetic mechanism 526 may be shaped to conform to and contact the base portion 512 and extendable portions 514. The magnetic mechanism 526 may be conductive and contain a magnet or be formed of a magnetic material. Accordingly, the magnetic mechanism 526 may be magnetically attracted to the base portion 512 and extendable portions 514 and maintain contact with the base portion 512 and extendable portions 514. Further, since the magnetic mechanism 526 is conductive, the magnetic mechanism 526 may electrically couple the base portion 512 and extendable portions 514. As shown, the magnetic mechanism 526 may have a spool-like shape that can maintain contact and roll along the base portion 512 and extendable portions 514.

Figure 6:
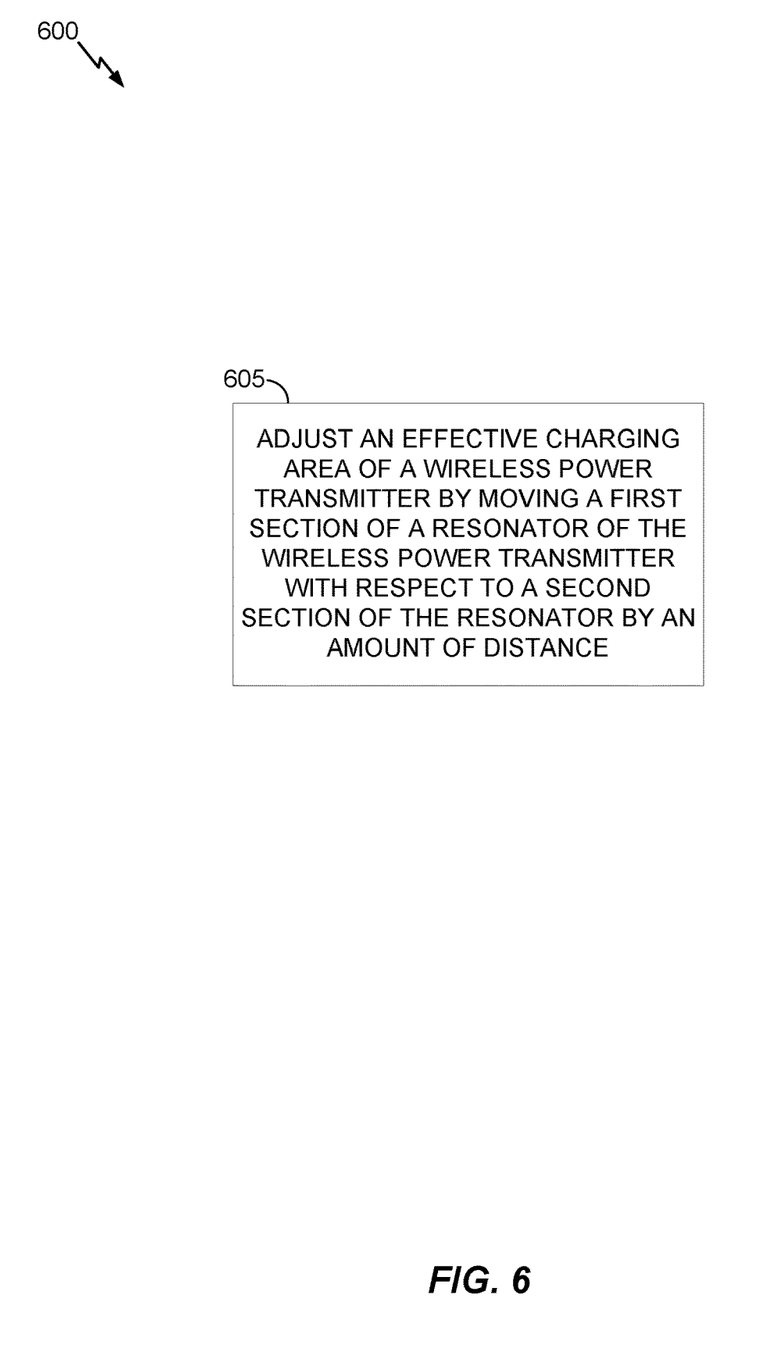
FIG. 6 illustrates example operations for operating a wireless power transmitter, according to certain aspects of this disclosure.

FIG. 6 illustrates example operations 600 for operating a wireless power transmitter, according to certain aspects of this disclosure.

At 605, an effective charging area of the wireless power transmitter is adjusted. For example, the wireless power transmitter may include a resonator. The resonator includes a first section and a second section. In some aspects, the effective charging area of the wireless power transmitter is adjusted by moving the first section of the resonator with respect to the second section of the resonator by an amount of distance. The second section is coupled electrically and physically to the first section. In some aspects, the effective charging area of the wireless power transmitted is based at least in part on the amount of distance the first section is moved with respect to the second section.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless power resonator comprising:
   a first section; and
   a second section electrically coupled and physically coupled to the first section, the second section configured to be movable with respect to the first section while remaining both electrically coupled and physically coupled to the first section to change an effective area of the wireless power resonator.

2. The wireless power resonator of claim 1, wherein the first section comprises a resonator, and wherein the second section comprises a shorting component configured to electrically couple a first portion of the first section to a second portion of the first section.

3. The wireless power resonator of claim 2, wherein the shorting component comprises a magnet configured to physically couple the first section to the shorting component.

4. The wireless power resonator of claim 2, further comprising one or more electromagnets configured to move the shorting component with respect to the first section.

5. The wireless power resonator of claim 1, further comprising a contact element configured to electrically couple and physically couple the first section to the second section.

6. The wireless power resonator of claim 5, wherein the contact element comprises a conductive spring coupled to contacts that physically contact the first section and the second section.

7. The wireless power resonator of claim 5, wherein the contact element comprises a conductive magnetic element that physically contacts the first section and the second section.

8. The wireless power resonator of claim 1, wherein at least a portion of the first section or the second section comprises a flexible conductor.

9. The wireless power resonator of claim 1, wherein at least a portion of the first section or the second section comprises a deformable wire.

10. A wireless power transmitter comprising:
a housing comprising a first portion and a second portion configured to be movable with respect to one another; and
a resonator comprising:
a first section attached to the first portion of the housing; and
a second section attached to the second portion of the housing, the second section configured to be movable with respect to the first section.

11. The wireless power transmitter of claim 10, wherein at least a part of the first section or the second section comprises a flexible conductor.

12. The wireless power transmitter of claim 10, wherein at least a part of the first section or the second section comprises a deformable wire.

13. The wireless power transmitter of claim 10, further comprising a contact element configured to electrically couple and physically couple the first section to the second section.

14. The wireless power transmitter of claim 13, wherein the contact element comprises a conductive spring coupled to contacts that physically contact the first section and the second section.

15. The wireless power transmitter of claim 13, wherein the contact element comprises a conductive magnetic element that physically contacts the first section and the second section.

16. The wireless power transmitter of claim 10, further comprising a motor configured to move the first portion of the housing with respect to the second portion of the housing.

17. A wireless power resonator comprising:
a resonator; and
a shorting bar configured to electrically couple a first portion of the resonator to a second portion of the resonator, the shorting bar further configured to be movable with respect to the resonator while remaining both electrically coupled and physically coupled to the resonator to change an effective area of the resonator.

18. The wireless power resonator of claim 17, wherein the resonator comprises a plurality of turns, and wherein the shorting bar is configured to separately electrically couple a first portion of a first turn of the resonator to a second portion of the first turn and a first portion of a second turn of the resonator to a second portion of the second turn.

19. The wireless power resonator of claim 17, wherein the shorting bar comprises a magnet configured to physically couple the resonator to the shorting bar.

20. The wireless power resonator of claim 17, further comprising one or more electromagnets configured to move the shorting bar with respect to the resonator.

21. A method of operating a wireless power transmitter, the method comprising:
adjusting an effective charging area of the wireless power transmitter, the adjusting comprising moving a first section of a resonator with respect to a second section of the resonator by an amount of distance, the second section being coupled electrically and physically to the first section.

22. The method of claim 21, wherein the effective charging area of the wireless power transmitter is based at least in part on the amount of distance moved.

23. The method of claim 21, wherein the adjusting of the effective charging area further comprises shorting a portion of one or more windings of the second section of the resonator via the first section.

24. The method of claim 21, wherein the adjusting of the effective charging area further comprises extending one or more portions of a housing of the wireless power transmitter coupled to the first section relative to one or more portions of the housing coupled to the second section.

25. The method of claim 24, wherein extending one or more portions of the housing coupled to the first section relative to one or more portions of the housing coupled to the second section comprises operating a motor.

26. The method of claim 21, wherein moving the first section of the resonator with respect to the second section of the resonator comprises selectively coupling a power source to one or more electromagnets to attract the second section of the resonator.

* * * * *